(12) United States Patent
Anthony et al.

(10) Patent No.: US 6,437,040 B2
(45) Date of Patent: Aug. 20, 2002

(54) WATER-SOLUBLE BLOCK COPOLYMERS COMPRISING A HYDROPHILIC BLOCK AND A HYDROPHOBIC BLOCK

(75) Inventors: Olivier Anthony, Enghien les Bains; Cécile Bonnet-Gonnet, Paris; Mathias Destarac, Paris; Roya Farhoosh, Paris, all of (FR); Mathieu Joanicot, Lawrenceville; Gilda Lizarraga, Cranbury, both of NJ (US); Roland Reeb, Gressy; Jean-Marie Schwob, Noisi le Roi, both of (FR)

(73) Assignee: Rhodia Chimie, Boulogne Billancourt Cedex (FR)

( * ) Notice: Subject to any disclaimer, the term of this patent is extended or adjusted under 35 U.S.C. 154(b) by 0 days.

(21) Appl. No.: 09/793,169

(22) Filed: Feb. 26, 2001

Related U.S. Application Data

(63) Continuation-in-part of application No. 09/387,487, filed on Sep. 1, 1999, now abandoned.

(51) Int. Cl.$^7$ .............................................. C08L 53/00
(52) U.S. Cl. .......................... 524/505; 524/824; 525/71
(58) Field of Search ................................. 524/505, 824; 525/71

(56) References Cited

U.S. PATENT DOCUMENTS

| | | | |
|---|---|---|---|
| 4,835,211 A | 5/1989 | Noda | ........................ 526/312 |
| 5,219,945 A | 6/1993 | Dicker | |
| 5,856,409 A | 1/1999 | Ziemelis | |
| 6,111,025 A | * 8/2000 | Visger et al. | ................ 525/244 |

FOREIGN PATENT DOCUMENTS

| | | |
|---|---|---|
| EP | 0 296 850 | 12/1988 |
| EP | 0 349 232 | 1/1990 |
| EP | 0 887 362 | 12/1998 |
| FR | 2 773 161 | 7/1999 |
| WO | WO 92 07014 | 4/1992 |
| WO | WO 92 13903 | 8/1992 |
| WO | WO 01 16187 | 3/2001 |

OTHER PUBLICATIONS

International Search Report.

* cited by examiner

*Primary Examiner*—James J. Seidleck
*Assistant Examiner*—Olga Asinovsky

(57) ABSTRACT

The invention relates to water-soluble block copolymers comprising at least one block of hydrophobic nature and at least one block of hydrophilic nature, the block of hydrophobic nature exhibiting hydrophilic units in an amount of between 33% and 99% by weight with respect to the total weight of the units of the hydrophobic block. These copolymers are preferably diblocks or triblocks and are prepared by a polymerization process referred to as a living or controlled. Control of their hydrophilic-lipophilic balance makes it possible to adjust their solubility in water and their self-association properties. These copolymers can be used in particular as adhesion agents or wetting agents.

24 Claims, No Drawings

WATER-SOLUBLE BLOCK COPOLYMERS COMPRISING A HYDROPHILIC BLOCK AND A HYDROPHOBIC BLOCK

This is a continuation-in-part of U.S. application Ser. No. 09/387,487, filed on Sep. 1, 1999, now abandoned.

The present invention relates to novel water-soluble block polymers comprising a hydrophobic block and a hydrophilic block, the solubility and the self-association properties of which can be adjusted when they are diluted in water.

Numerous studies have been carried out on amphiphilic block polymers. These studies generally involve organic solvent media, more rarely aqueous media. This is because, in the amphiphilic block polymers studied to date, the strong hydrophobicity of the hydrophobic block generally results in irreversible and unbalanced phenomena of aggregation or of micelleization when operating in water. Control of the mechanisms and structures is then accomplished by changing to a solvent medium. The only amphiphilic block polymers with structures which have been studied at equilibrium are polymers exhibiting a hydrophobic block and a neutral water-soluble block, for example polyethylene (PEE)/poly(ethylene oxide) (PEO) or poly(propylene oxide)/poly(ethylene oxide) diblocks.

A few studies have been carried out on amphiphilic block polymers exhibiting a hydrophobic block and an anionic hydrophilic block. It has been shown that, when these polymers are soluble in water, they remain in the form of spherical micelles (star-like micelles). Furthermore, these polymers are only soluble when the anionic hydrophilic block is very high in weight in comparison to the hydrophobic block, which greatly restricts the number of polymers which can be used. Finally, they are not really soluble since it has been shown that their critical micelle concentration is extremely low. Because of the presence of micelles at very low concentrations, the systems obtained, when these copolymers are dissolved in water, are in fact suspensions with a viscosity which increases strongly with the concentration. Above a critical concentration of the order of 1% by weight, they become gels which are difficult to handle.

Without wishing to restrict the invention to a scientific theory, one aim of the present invention is to provide soluble copolymers, that is to say copolymers for which each macromolecule thereof has the property of being individually soluble without the appearance of aggregation or of micelleization.

Another aim of the present invention is to provide water-soluble copolymers with a hydrophobic/hydrophilic structure.

Another aim is to provide copolymers with a solubility which can be adjusted and with self-association properties which can be adjusted.

Another aim is to be able to obtain an aqueous solution of these copolymers which is liquid and transparent over a broad concentration range.

These aims and others are achieved by the present invention, this being because the latter relates to a block copolymer comprising at least one block of hydrophobic nature and at least one block of hydrophilic nature, the block of hydrophobic nature exhibiting hydrophilic units in an amount of between 33 and 99%, preferably between 33 and 80%, with respect to the total weight of the units of the hydrophobic block.

According to the invention, these copolymers are preferably prepared by a polymerization process referred to as living or controlled.

The invention also relates to a process for controlling the hydrophilic-lipophilic balance of amphiphilic block copolymers exhibiting at least one block resulting from the polymerization of hydrophilic monomers and at least one block resulting from the polymerization of hydrophobic monomers, in which process:

hydrophilic units are introduced into the block resulting from the polymerization of hydrophobic monomers, and/or hydrophobic units are introduced into the block resulting from the polymerization of hydrophilic monomers.

Finally, the invention relates to the use of these block copolymers in particular as adhesion primers in paints or as wetting agents.

In the description which follows, the term "block of hydrophobic nature" is understood to mean a hydrophobic polymer block exhibiting hydrophilic units in an amount of between 33 and 99%, preferably between 33 and 80%, with respect to the total weight of the units of said block of hydrophobic nature. The term "unit" is understood to mean the part of the block which corresponds to one monomer unit.

Likewise, the term "block of hydrophilic nature" is understood to mean a polymer block comprising solely hydrophilic units or exhibiting at most 20% or from 1 to 20% by weight of hydrophobic units with respect to the total weight of the units of said block of hydrophilic nature. The block of hydrophilic nature is soluble in water.

The invention also relates to a process for controlling the hydrophilic-lipophilic balance of amphiphilic block copolymers exhibiting at least one block resulting from the polymerization of hydrophilic monomers and at least one block resulting from the polymerization of hydrophobic monomers, in which process:

hydrophilic units are introduced into the block resulting from the polymerization of hydrophobic monomers, and/or hydrophobic units are introduced into the block resulting from the polymerization of hydrophilic monomers.

The properties of the copolymers according to the present invention can be obtained by the choice of the nature of the hydrophobic blocks and of the nature of the hydrophilic blocks, at least the hydrophobic blocks having to comprise hydrophilic units according to a precise amount.

According to a first alternative form, the blocks of hydrophobic nature and the blocks of hydrophilic nature can result from the copolymerization of hydrophobic and hydrophilic monomers. The amounts of hydrophilic and hydrophobic units in each of said blocks are then controlled by the respective contents of hydrophilic monomers and of hydrophobic monomers during the polymerization of the blocks.

Thus, the blocks of hydrophobic nature can result from the copolymerization of hydrophobic monomers and hydrophilic monomers, the hydrophilic monomers being present in an amount of between 33 and 99% by weight, preferably between 33 and 80% by weight, with respect to the total weight of the units of the hydrophobic block.

Likewise, the blocks of hydrophilic nature can result from the copolymerization of hydrophilic monomers and optionally of hydrophobic monomers, the hydrophobic monomers being present in an amount of less than 20% by weight, preferably of at least 1% by weight, or more preferably still of between 1 and 20%, with respect to the total weight of the units of the hydrophilic block.

According to a second alternative form, the blocks of hydrophobic nature and the blocks of hydrophilic nature of the preceding copolymers can result:

from the polymerization of monomers which can be rendered hydrophilic by hydrolysis and optionally of non-hydrolysable hydrophobic monomers and/or of hydrophilic monomers, and then from the hydrolysis of the polymer obtained.

During the hydrolysis, the units corresponding to the hydrolysable monomers are hydrolysed to hydrophilic units.

The amounts of hydrophilic and hydrophobic units in each of said blocks are then controlled by the amount of each type of monomer and by the degree of hydrolysis.

According to this second alternative form, various implementations can be envisaged.

According to a first implementation, the block can be obtained by:

homopolymerization of hydrophobic monomers which can be rendered hydrophilic by hydrolysis, and partial hydrolysis of the homopolymer obtained to a degree such that:

either, in the case of the blocks of hydrophobic nature, an amount of hydrophilic units of between 33 and 99%, preferably between 33 and 75%, with respect to the total weight of the units of the hydrophobic block is obtained, or, in the case of the blocks of hydrophilic nature, an amount of hydrophobic units of less than 20% by weight, preferably of at least 1% by weight, more preferably still of between 1 and 20%, with respect to the total weight of the units of the hydrophilic block is obtained.

According to a second implementation, the blocks can be obtained by:

copolymerization of hydrophobic monomers which can be rendered hydrophilic by hydrolysis and of hydrophobic monomers which cannot be rendered hydrophilic by hydrolysis, then complete or partial hydrolysis of the polymer obtained.

According to this second implementation, the amount of hydrophilic and hydrophobic units can depend on two criteria: the contents of the various types of monomer and the degree of hydrolysis.

If the hydrolysis is partial, both the content of monomers and the degree of hydrolysis can be varied.

According to a third implementation, the blocks can be obtained by:

copolymerization of hydrophobic monomers which can be rendered hydrophilic by hydrolysis and of hydrophilic monomers, then partial hydrolysis of the polymer obtained to a degree such that:

either, in the case of the blocks of hydrophobic nature, an amount of hydrophilic units of between 33 and 99%, preferably between 33 and 80%, with respect to the total weight of the units constituting the group of hydrophobic nature is obtained, or, in the case of blocks of hydrophilic nature, an amount of hydrophobic units of less than 20% by weight, preferably of at least 1% by weight, more preferably still of between 1 and 20%, with respect to the total weight of the units constituting the group of hydrophilic nature is obtained.

Generally, the hydrophobic monomers can be chosen from:

vinylaromatic monomers, such as styrene, dienes, such as butadiene, alkyl acrylates and methacrylates, the alkyl group of which comprises from 1 to 10 carbon atoms, such as methyl, ethyl, n-butyl, 2-ethylhexyl, t-butyl, isobornyl, phenyl or benzyl acrylates and methacrylates.

It is preferably styrene.

The hydrophilic monomers can be chosen from:

carboxylic acids comprising ethylene unsaturation, such as acrylic and methacrylic acids, neutral hydrophilic monomers, such as acrylamide and its derivatives (N-methylacrylamide or N-isopropylacrylamide) and methacrylamide. Mention may also be made, as examples, of macromonomers of poly(ethylene glycol) (meth)acrylate, poly(vinyl alcohol) (meth)acrylate, poly(hydroxy($C_1$–$C_4$)alkyl (meth)acrylate) (meth)acrylate, poly(N-methylolacrylamide) (meth)acrylate and poly((meth)acrylamide) (meth)-acrylate type. These macromonomers can be obtained, for example, by transesterification of methyl acrylate or methacrylate or of (meth)acrylic anhydride or of acryloyl or methacryloyl chloride. They can also be obtained by direct esterification of acrylic or methacrylic acid. Some monomers can be obtained by telomerization, such as those of the poly((meth)acrylamide) (meth)acrylate type.

anionic hydrophilic monomers: sodium 2-acrylamido-2-methylpropanesulphonate (AMPS), sodium styrenesulphonate or sodium vinylsulphonate.

The monomers which can be rendered hydrophilic by hydrolysis can be chosen from:

acrylic and methacrylic esters which can be hydrolysed to acid, such as methyl acrylate, ethyl acrylate, hydroxyethyl methacrylate, hydroxyethyl acrylate or tert-butyl acrylate, vinyl acetate which can be hydrolysed to vinyl alcohol units, quaternized 2-dimethylaminoethyl methacrylate and acrylate (madamquat and adamquat), acrylamide and (meth)acrylamide.

The block copolymers according to the invention are preferably diblock copolymers.

However, they can also be triblock or indeed even multiblock copolymers.

According to the preferred form of the invention, the copolymer is a diblock copolymer comprising a block of hydrophilic nature and a block of hydrophobic nature, in which:

the block of hydrophilic nature comprises acrylic acid (AA) units and ethyl acrylate (EtA) units, and the block of hydrophobic nature comprises styrene (St) and methacrylic acid (MAA) and/or hydroxyethyl methacrylate (HEMA) units.

Preferably, according to this embodiment, the block of hydrophilic nature results:

from the polymerization of acrylic acid (AA) and of ethyl acrylate (EtA) in an EtA/AA ratio by weight of 10/90, and then from the hydrolysis of the polymer obtained to a degree of at least 80 mol %.

The block of hydrophobic nature itself preferably results from the polymerization of a mixture of monomers comprising at least 33% by weight of styrene.

The block polymers according to the invention generally exhibit a molecular mass of at most 100,000 g/mol, preferably of at least 1000 g/mol.

Generally, the preceding block copolymers can be obtained by any polymerization process referred as living or controlled, such as, for example:

radical polymerization controlled by xanthates, according to the teaching of Application WO 98/58974, radical polymerization controlled by dithioesters, according to the teaching of Application WO 97/01478, polymerization using nitroxide precursors, according to the teaching of Application WO 99/03894, radical polymerization controlled by dithiocarbamates, according to the teaching of Application WO 99/31144, atom transfer radical polymerization (ATRP), according to the teaching of Application WO 96/30421, radical polymerization controlled by iniferters, according to the teaching of Otu et al., Makromol. Chem. Rapid. Commun., 3, 127 (1982), radical polymerization controlled by iodine degenerative transfer, according to the teaching of Tatemoto et al., Jap., 50, 127, 991 (1975), Daikin Kogyo Co. Ltd. Japan and Matyjaszewski et al., Macromolecules, 28, 2093 (1995), group transfer polymerization, according to the teaching of Webster O. W., "Group Transfer Polymerization", p. 580–588 of the "Encyclopedia of Polymer Science and Engineering", vol. 7 and edited by H. F. Mark, N. M. Bikales, C. G. Overberger and G. Menges, Wiley Interscience, New York, 1987, radical polymerization controlled by tetraphenylethane derivatives (D. Braun et al., Macromol. Symp., 111, 63 (1996)), radical polymerization controlled by organocobalt complexes (Wayland et al., J. Am. Chem. Soc., 116, 7973 (1994)).

The preferred polymerization is living radical polymerization using xanthates.

The invention thus additionally relates to a process for the preparation of these block polymers.

This process consists in:

1—bringing into contact:
   at least one ethylenically unsaturated monomer,
   at least one source of free radicals, and
   at least one compound of formula (I):

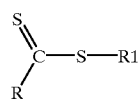

(I)

in which:

R represents an R2O—, R2R'2N— or R3— group, with:

R2 and R'2, which are identical or different, representing (i) an alkyl, acyl, aryl, alkene or alkyne group or (ii) an optionally aromatic, saturated or unsaturated, carbonaceous ring or (iii) a saturated or unsaturated heterocycle, it being possible for these groups and rings (i), (ii) and (iii) to be substituted, R3 representing H, Cl, an alkyl, aryl, alkene or alkyne group, a saturated or unsaturated (hetero) cycle, these optionally being substituted, an alkylthio, alkoxycarbonyl, aryloxycarbonyl, carboxyl, acyloxy, carbamoyl, cyano, dialkyl- or diarylphosphonato or dialkyl- or diarylphosphinato group or a polymer chain, R1 represents (i) an optionally substituted alkyl, acyl, aryl, alkene or alkyne group or (ii) an optionally substituted or aromatic, saturated or unsaturated carbonaceous ring or (iii) an optionally substituted, saturated or unsaturated heterocycle, or a polymer chain, 2—repeating the preceding contacting operation at least once using:
   different monomers from the preceding implementation, and
   in place of the precursor compound of formula (I), the polymer resulting from the preceding implementation, 3—optionally hydrolysing the copolymer obtained.

R1, R2, R'2 and R3 groups can be substituted by alkyl groups, phenyl groups, which are substituted, substituted aromatic groups, oxo, alkoxycarbonyl or aryloxycarbonyl (—COOR), carboxyl (—COOH), acyloxy (—O2CR), carbamoyl (—CONR$_2$), cyano (—CN), alkylcarbonyl, alkylarylcarbonyl, arylcarbonyl, arylalkylcarbonyl, isocyanato, phthalimido, maleimido, succinimido, amidino, guanidino, hydroxyl (—OH), amino (—NR$_2$), halogen, allyl, epoxy, alkoxy (—OR), S-alkyl, S-aryl or silyl groups, or groups exhibiting a hydrophilic or ionic nature, such as alkaline salts of carboxylic acids, alkaline salts of sulphonic acid, poly(alkylene oxide) (PEO, PPO) chains or cationic substituents (quaternary ammonium salts), R representing an alkyl or aryl group.

The compound of formula (I) is preferably a dithiocarbonate chosen from the compounds of the following formulae (IA), (IB) and (IC):

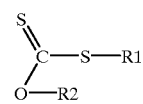

(IA)

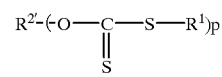

(IB)

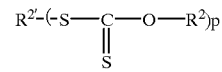

(IC)

in which:

R2 and R2' represent (i) an alkyl, acyl, aryl, alkene or alkyne group or (ii) an optionally aromatic, saturated or unsaturated carbonaceous ring or (iii) a saturated or unsaturated heterocycle, it being possible for these groups and rings (i), (ii) and (iii) to be substituted, R1 and R1' represent (i) an optionally substituted alkyl, acyl, aryl, alkene or alkyne group or (ii) an optionally substituted or aromatic, saturated or unsaturated carbonaceous ring or (iii) an optionally substituted, saturated or unsaturated heterocycle, or a polymer chain, p is between 2 and 10.

During stage 1, a first block of the polymer of hydrophilic or hydrophobic nature, according to the nature and the amount of monomers used, is synthesized. During stage 2, the other block of the polymer is synthesized.

The ethylenically unsaturated monomers will be chosen from the hydrophilic, hydrophobic and hydrolysable monomers defined above in proportions suitable for obtaining a block copolymer with blocks exhibiting the characteristics of the invention. According to its process, if all the successive polymerizations are carried out in the same reactor, it is generally preferable for all the monomers used during one stage to be consumed before the polymerization of the following stage begins, thus before the new monomers are introduced. However, it may happen that the hydrophobic or hydrophilic monomers of the preceding stage are still present in the reactor during the polymerization of the following block. In this case, these monomers generally do not represent more than 5 mol % of all the monomers and they participate in the following polymerization by contributing to an introduction of the hydrophobic or hydrophilic units into the following block.

For further details with regard to the preceding polymerization process, reference may be made to the content of U.S. Pat. No. 6,153,605 cited as reference in the present description.

The hydrolysis can be carried out using a base or an acid. The base can be chosen from alkali metal or alkaline earth metal hydroxides, such as sodium hydroxide or potassium hydroxide, alkali metal alkoxides, such as sodium methoxide, sodium ethoxide, potassium methoxide, potassium ethoxide or potassium t-butoxide, ammonia and amines, such as triethylamine. The acids can be chosen from sulphuric acid, hydrochloric acid or para-toluenesulphonic acid. Use may also be made of an ion-exchange resin or an ion-exchange membrane of cationic or anionic type. The hydrolysis is generally carried out at a temperature of between 5 and 100° C., preferably between 15 and 90° C.

After hydrolysis, the block copolymer can be washed, for example by dialysis against water or using a solvent, such as alcohol. It can also be precipitated by lowering the pH below 3.5.

The hydrolysis can be carried out on a single-block polymer, which will subsequently be associated with other blocks, or on the final block polymer.

Finally, the invention relates to the use of the preceding block copolymers as adhesion promoters. They can also be used as wetting agents or hydrophilization agents for the coating of more or less hydrophobic surfaces with a persistent effect after rinsing. Preferably, the polymers can be used in an amount generally of between 0.1% and 10% by weight with respect to the aqueous medium. The block copolymers according to the invention thus exhibit the advantage of improving adhesion of paints to hydrophobic substrates, such as plastic substrates, and raising the adhesion of fibers and plastics with materials prepared from aqueous dispersions. In this specific application as adhesion agent, it is recommended to use from 0.1 to 10%, preferably from 0.5 to 5%, by weight of copolymer with respect to the total weight of the paint. In the application as wetting agent in aqueous solution, it is recommended to use an amount of 0.01 to 3%, preferably of 0.1 to 1%, by weight of copolymer with respect to the total weight of said solution.

The following examples illustrate the invention without, however, limiting the scope thereof.

In the examples which follow:
Mn represents the number-average molecular mass Mn of the polymers; Mn is expressed in polystyrene equivalents (g/mol),
Mw represents the weight-average molecular mass (g/mole),
Mw/Mn represents the polydispersity index,
the polymers, before hydrolysis, are analysed by chromatography (GPC) with THF as elution solvent.

I) Solubility of a Poly(styrene/acrylic Acid)-b-poly(acrylic Acid) Diblock Copolymer in Water:

The solubility of four diblock copolymers hereinbelow with a total molecular weight of 16,000 g/mole, with a first random copolymer block of styrene (Sty), acrylic acid (AA) and methacrylic acid (MAA) with a molecular weight Mn of 1000-2000 and a second random copolymer block of acrylic acid (AA) and of methacrylic acid (MAA) with Mn=15,000–14,000, is studied. These copolymers are prepared by following the procedure hereinbelow while choosing the amounts of monomers as shown in Table 3 hereinbelow:

TABLE 1

| Diblock copolymers | | % by weight of acrylic acid in the 1st block |
|---|---|---|
| $\{[Sty]_9[MA]_{0.2}\}$-b-$\{[AA]_{198}[MAA]_{12}\}$ comparative example | (1) | 0% |
| $\{[Sty]_{14}[MA]_{0.5}[AA]_5\}$-b-$\{[AA]_{185}[MAA]_{11}\}$ comparative example | (2) | 23% |
| $\{[Sty]_{10}[MA]_{0.5}[AA]_{10}\}$-b-$\{[AA]_{185}[MAA]_{11}\}$ | (3) | 48% |
| $\{[Sty]_5[MA]_{0.5}[AA]_{15}\}$-b-$\{[AA]_{185}[MAA]_{11}\}$ | (4) | 73% |
| $\{[Sty]_7[MA]_4[AA]_{212}\}$ comparative example | (5) | n/a |

COMPARATIVE EXAMPLE

These copolymers are also compared with the poly (styrene/acrylic acid) random copolymer (5) as defined hereinabove with an Mn of 16,000 and an St/AA/MA ratio by mass of 4.6/93/2.4. The two techniques of light scattering and of spectrofluorometry are used to study the properties of these copolymers in aqueous solutions.

I-A) Synthesis and Hydrolysis of Comparative Copolymer (1):
I-A.1) Synthesis of Diblock (1):
Synthesis of a random copolymer of styrene and of methacrylic acid. Ratios by mass: St/MAA=98/2.

The polymerization is carried out under emulsion conditions, in a jacket reactor equipped with a stainless steel three-bladed stirrer. 488.8 g of water, 10.13 g of the sodium salt of dodecyl sulphate (Aldrich) and 0.11 g of sodium carbonate $Na_2CO_3$ are introduced at ambient temperature as vessel heel. The mixture obtained is stirred for 30 minutes (190 rev/min) under nitrogen. The stirring continues for an additional period of 55 minutes, during which the temperature is raised to 75° C., and then a mixture comprising 3.03 g of styrene, 6.4 g of methyl α-(o-ethylxanthyl)propionate $(CH_3CHCO_2Me)SCSOEt$ and 0.061 g of methacrylic acid is incorporated. The temperature is subsequently raised to 85° C. and 1.40 g of ammonium persulphate $(NH_4)_2S_2O_8$ are added.

After 5 minutes, the addition is continued of 27.22 g of styrene and 0.55 g of methacrylic acid over one hour. After the addition is complete, an emulsion polymer (latex) is obtained which is maintained at 85° C. for one hour.

53.77 g of the emulsion copolymer obtained above (first block) are withdrawn. 0.64 g of an ammonium persulphate $(NH_4)_2S_2O_8$ and 5.5 g of water are added at 85° C. to the remaining emulsion. After 5 minutes, the addition is begun of a mixture composed of:
  567.9 g of ethyl acrylate (EtA),
  11.59 g of methacrylic acid (MAA),
and simultaneously another composed of:
  445.9 g of water,
  0.65 g of $Na_2CO_3$.
The addition lasts 1 hour. The system is maintained at this temperature for an additional three hours.
I-A.2) Hydrolysis:
The diblock copolymer (1) thus obtained is subsequently hydrolysed. The reaction is carried out in a jacketed reactor equipped with a stainless steel three-bladed stirrer. The following are introduced therein:
  50 g of the preceding copolymer (solids content of 41.37%), 265 g of water (to adjust the solids content to 4%).

The temperature is brought to 85° C. and, however, the emulsion is stirred vigorously. Subsequently, 194 g of 2N sodium hydroxide (corresponding to two molar equivalents of sodium hydroxide with respect to the ethyl acrylate) are added thereto for two hours. After complete addition of the sodium hydroxide, the temperature is brought to 95° C. and the reaction mixture is maintained under these conditions for 48 hours.

I-B) Synthesis and Hydrolysis of Comparative Copolymer (2):

I-B-1. Synthesis of Diblock (2):

Synthesis of a random copolymer of styrene, of methacrylic acid and of ethyl acrylate with ratios by mass: St/MAA/EtA=75/2/23.

The polymerization is carried out under emulsion conditions in a jacketed reactor equipped with a stainless steel three-bladed stirrer. 840 g of water, 12.76 g of the sodium salt of dodecyl sulphate (Aldrich) and 0.28 g of sodium carbonate $Na_2CO_3$ are introduced at ambient temperature as vessel heel. The mixture obtained is stirred for 30 minutes (190 rev/min) under nitrogen. The stirring continues for an additional period of 55 minutes, during which the temperature is raised to 75° C., and then a mixture comprising 5.93 g of styrene, 8.24 g of methyl α-(o-ethylxanthyl)propionate $(CH_3CHCO_2Me)SCSOEt$, 0.16 g of methacrylic acid and 1.82 g of ethyl acrylate is incorporated. The temperature is subsequently raised to 85° C. and 1.8992 g of ammonium persulphate $(NH_4)_2S_2O_8$ are added.

After five minutes, the addition is continued of 53.46 g of styrene, 1.43 g of methacrylic acid and 16.41 g of ethyl acrylate over one hour. After the addition is complete, an emulsion polymer (latex) is obtained, which is maintained at 85° C. for one hour.

314 g of the emulsion copolymer obtained above are withdrawn. 0.60 g of ammonium persulphate $(NH_4)_2S_2O_8$ and 8 g of water are added to it at 85° C. after five minutes, the addition is begun of a mixture composed of:

503.96 g of ethyl acrylate (EtA), 10.28 g of methacrylic acid (MAA), and simultaneously another composed of:

320 g of water, 0.57 g of $Na_2CO_3$.

The addition lasts 1 hour. The system is maintained at this temperature for an additional three hours.

I-B-2) Hydrolysis of the Diblock Copolymer:

The hydrolysis is also carried out in a jacketed reactor equipped with a stainless steel three-bladed stirrer. The following are introduced therein:

49.9 g of the preceding copolymer (solids content of 39.66%), 264.3 g of water (to adjust the solids content to 4%).

The temperature is brought to 85° C. and, however, the emulsion is stirred vigorously. Subsequently, 185 g of 2N sodium hydroxide (corresponding to two molar equivalents of sodium hydroxide with respect to the ethyl acrylate) are added thereto over two hours. After complete addition of the sodium hydroxide, the temperature is brought to 95° C. and the reaction is maintained under these conditions for 48 hours.

I-C) Synthesis and Hydrolysis of Copolymer (3):

I-C-1) Synthesis of Diblock (3):

Synthesis of a random copolymer of styrene, of methacrylic acid and of ethyl acrylate with ratios by mass: St/MAA/EtA=55/2/43.

The polymerization is carried out under emulsion conditions in a jacketed reactor equipped with a stainless steel three-bladed stirrer. 572 g of water, 11.4 g of the sodium salt of dodecyl sulphate (Aldrich) and 0.25 g of sodium carbonate $Na_2CO_3$ are introduced at ambient temperature as vessel heel. The mixture obtained is stirred for 30 minutes (190 rev/min) under nitrogen. The stirring continues for an additional period of 55 minutes, during which the temperature is raised to 75° C., and then a mixture comprising 3.54 g of styrene, 7.36 g of methyl α-(o-ethylxanthyl)propionate $(CH_3CHCO_2Me)SCSOEt$, 0.14 g of methacrylic acid and 3.39 g of ethyl acrylate is incorporated. The temperature is subsequently raised to 85° C. and 1.65 g of ammonium persulphate $(NH_4)_2S_2O_8$ are added.

After five minutes, the addition is continued of 31.85 g of styrene, 1.27 g of methacrylic acid and 30.58 g of ethyl acrylate over one hour. After the addition is complete, an emulsion polymer (latex) is obtained, which is maintained at 85° C. for one hour.

153.10 g of the emulsion copolymer obtained above are withdrawn. 0.62 g of ammonium persulphate $(NH_4)_2S_2O_8$ and 5.5 g of water are added to it at 85° C. After five minutes, the addition is begun of a mixture composed of:

519.57 g of ethyl acrylate (EtA), 10.60 g of methacrylic acid (MAA), and simultaneously another composed of:

440 g of water, 0.59 g of $Na_2CO_3$.

The addition lasts 1 hour. The system is maintained at this temperature for an additional three hours.

I-C-2) Hydrolysis of the Diblock Copolymer:

Hydrolysis is also carried out in a jacketed reactor equipped with a stainless steel three-bladed stirrer. The following are introduced therein:

50 g of the preceding copolymer (solids content of 40.46%), 269 g of water (to adjust the solids content to 4%).

The temperature is brought to 85° C. and, however, the emulsion is stirred vigorously. Subsequently, 182 g of 2N sodium hydroxide (corresponding to two molar equivalents of sodium hydroxide with respect to the ethyl acrylate) are added thereto over two hours. After complete addition of the sodium hydroxide, the temperature is brought to 95° C. and the reaction is maintained under these conditions for 48 hours.

I-D) Synthesis and Hydrolysis of Copolymer (4):

I-D-1) Synthesis of Diblock (4):

Synthesis of a random copolymer of styrene, of methacrylic acid and of ethyl acrylate with ratios by mass: St/MAA/EtA=25/2/73.

The polymerization is carried out under emulsion conditions in a jacketed reactor equipped with a stainless steel three-bladed stirrer. 875 g of water, 13.9 g of the sodium salt of dodecyl sulphate (Aldrich) and 0.31 g of sodium carbonate $Na_2CO_3$ are introduced at ambient temperature as vessel heel. The mixture obtained is stirred for 30 minutes (190 rev/min) under nitrogen. The stirring continues for an additional 55 minutes, during which the temperature is raised to 75° C., and then the mixture comprising 2.16 g of styrene, 9.01 g of methyl α-(o-ethylxanthyl)propionate $(CH_3CHCO_2Me)SCSOEt$, 0.17 g of methacrylic acid and 6.32 g of ethyl acrylate is incorporated. The temperature is subsequently raised to 85° C. and 1.58 g of ammonium persulphate $(NH_4)_2S_2O_8$ are added.

After five minutes, the addition is continued of 19.49 g of styrene, 1.56 g of methacrylic acid and 56.91 g of ethyl acrylate over one hour. After the addition is complete, an emulsion polymer (latex) is obtained, which is maintained at 85° C. for one hour.

197.29 g of the emulsion copolymer obtained above are withdrawn. 0.79 g of ammonium persulphate $(NH_4)_2S_2O_8$ and 3.5 g of water are added to it at 85° C. After five minutes, the addition is begun of a mixture composed of:

661.27 g of ethyl acrylate (EtA),
13.49 g of methacrylic acid (MAA), and simultaneously another composed of:

420 g of water,
0.75 g of $Na_2CO_3$.

The addition lasts 1 hour. The system is maintained at this temperature for an additional three hours.

I-D-1) Hydrolysis of the Diblock copolymer:

The hydrolysis is also carried out in a jacketed reactor equipped with a stainless steel three-bladed stirrer. The following are introduced therein:

54 g of the preceding copolymer (solids content of 35.09%),
250.8 g of water (to adjust the solids content to 4%).

The temperature is brought to 85° C. and, however, the emulsion is stirred vigorously. Subsequently, 182 g of 2N sodium hydroxide (corresponding to two molar equivalents of sodium hydroxide with respect to the ethyl acrylate) are added thereto over two hours. After complete addition of the sodium hydroxide, the temperature is brought to 95° C. and the reaction is maintained under these conditions for 48 hours.

I-E) Synthesis and Hydrolysis of Copolymer (5)

I-E-1) Synthesis of a random copolymer of styrene, of methacrylic acid and of ethyl acrylate with ratios by mass: St/MAA/EtA=4.6/2.4/93.

The polymerization is carried out under emulsion conditions in a jacketed reactor equipped with a stainless steel three-bladed stirrer. 492 g of water, 4.79 g of the sodium salt of dodecyl sulphate (Aldrich) and 1.39 g of sodium carbonate $Na_2CO_3$ are introduced at ambient temperature as vessel heel. The mixture obtained is stirred for 30 minutes (190 rev/min) under nitrogen. The stirring continues for an additional 55 minutes, during which the temperature is raised to 75° C., and then a mixture comprising 1.45 g of styrene, 3.04 g of methyl α-(o-ethylxanthyl)propionate ($CH_3CHCO_2Me$) SCSOEt, 0.77 g of methacrylic acid and 29.67 g of ethyl acrylate is incorporated. The temperature is subsequently raised to 85° C. and 1.27 g of ammonium persulphate $(NH_4)_2S_2O_8$ are added.

After five minutes, the addition is continued of 13.10 g of styrene, 6.95 g of methacrylic acid and 267.30 g of ethyl acrylate over one hour. After the addition is complete, an emulsion polymer (latex) is obtained, which is maintained at 85° C. for one hour.

I-E-2) Hydrolysis of the Copolymer:

The hydrolysis of the copolymer is also carried out in a jacketed reactor equipped with a stainless steel three-bladed stirrer. The following are introduced therein:

83 g of the preceding copolymer (solids content of 36%),
136 g of water (to adjust the solids content to 6%).

The temperature is brought to 85° C. and, however, the emulsion is stirred vigorously. Subsequently, 281 g of 2N sodium hydroxide (corresponding to two molar equivalents of sodium hydroxide with respect to the ethyl acrylate) are added thereto over two hours. After complete addition of the sodium hydroxide, the temperature is brought to 95° C. and the reaction is maintained under these conditions for 48 hours.

All the solutions of copolymers 1) to 5) are subsequently dialysed to remove the excess of NaOH and sodium dodecyl sulphate. The dialysis is carried out against deionised water using a Spectrapor® cellulose membrane with a molecular weight limit of 3500 (cut-off) for several days until the conductivity falls to 20 μS/cm. The solution is subsequently filtered and freeze-dried. The powder obtained is subsequently redissolved in deionised water.

Light scattering measurements carried out on the solutions of copolymers 1 to 5 thus obtained show that copolymers 3, 4 and 5 are soluble, whereas copolymers 1 and 2 can be regarded as insoluble. The term "soluble" is understood to mean, as indicated above, the fact that each macromolecule is individually dissolved without aggregation or micelleization. This result is also confirmed by spectrofluorometry measurements and by electron microscopy.

II) Illustration of the Wetting Agent Properties of the Copolymers (1) to (5) Prepared Hereinabove:

The treated surfaces are, in a first series of experiments, test specimens made of silica glass methylated by a silanation reaction carried out in an oven at 90° C. by means of trichlorosilane for approximately one hour. The test specimens are washed and stored in alcohol before use. The advancing and receding contact angles of a drop of water are measured at angles of 90° C. and 76° respectively.

According to a first method, the test specimens are immersed in the copolymer solutions and then rinsed copiously with water or else these solutions are sprayed over the test specimens and dried.

The advancing and receding contact angles are measured with a Rame-Hart autogoniometer.

To measure the advancing contact angle, a deionized water syringe is placed so that the tip of the syringe is positioned 3 mm from the surface of the test specimen before causing a drop to fall. The angle is automatically measured by the Rame-Hart autogoniometer in 10 seconds. When two consecutive angle measurements are identical, this measure is then the advancing contact angle. The receding contact angle is measured by pumping small amounts of drop-forming liquid from the syringe and by measuring the angles between these reductions in volume. These measurements are repeated until two identical consecutive angle measurements are obtained; this measurement is then the receding contact angle. The copolymer solutions tested do or do not comprise sodium chloride. The results obtained are collated in Table 2 hereinbelow.

TABLE 2

| Copo | Copo concentration (wt %) | NaCl concentration | Steeping time (h) | After coating with the Copo. Solution | After extensive rinsing | Advancing contact angles | Receding contact angles |
|---|---|---|---|---|---|---|---|
| (3) | 1.0 | 0M | 15 | Slightly wetted | Rapidly dewets | | |
| (3) | 1.0 | 0M | 23 | Wetted | Rapidly dewets | 79.3° | 28.4° |
| (3) | 1.0 | 0.1M | 15/23 | Wetted | Slowly dewets | 74.3° | 10.5° |
| (3) | 2.0 | 0.1M | 16.5/20 | Wetted | Slowly dewets | | |
| (3) | 0.5 | 0M | 16 | Wetted, slowly dewets | Rapidly dewets | 84.8° | 50.5° |
| (3) | 0.5 | 0.1M | 16 | Wetted, slowly dewets | Rapidly dewets | 81.5° | 28.5° |
| (3) | 4.0 | 0M | 1 | Wetted | Very slowly dewets | 18.8° | 6.9° |

TABLE 2-continued

| Copo | Copo concentration (wt %) | NaCl concentration | Steeping time (h) | After coating with the Copo. Solution | After extensive rinsing | Advancing contact angles | Receding contact angles |
|---|---|---|---|---|---|---|---|
| (4) | 2 | 0.1M | 17.5/21 | Dry | Hydrophobic | | |
| (4) | 2.5 | 0.1M | 17.5/21 | Wetted to only a very slight extent but dewets | Hydrophobic | | |
| (4) | 4 | 0.1M | 17.5/21 | Wetted but dewets | Hydrophobic | | |
| (4) | 6 | 0.1M | 17.5/21 | Wetted but dewets | Hydrophobic | | |
| (5) | 1 | 0M | 1 | Wetted to only a very slight extent and immediately dewets | Hydrophobic | | |
| (5) | 1 | 0M | 18.5 | Wetted to only a very slight extent and immediately dewets | Hydrophobic | | |
| (1) | 1 | 0.1M | 19 | Dry | Hydrophobic | 81.6° | 53.1° |
| (3) | 0.1 | 0M | 16 | Slightly wetted, drops remain on the surface | Slightly wetted, drops remain on the surface | 68.6° | 34.5° |
| (3) | 0.1 | 0.1M | 16 | Wetted but slowly dewets | Wets but dewets more rapidly of the remaining water | 72.4° | 11.8° |
| (1) | 2.2 | 0M | 19 | Not many drops, immediately dewets | Hydrophobic | 100.3° | 79.3° |
| (1) | 2.2 | 0.1M | 19 | Not many drops, immediately dewets | Hydrophobic | 94° | 78.1° |

It is apparent from Table 2 that comparative copolymers (1) and (5) have virtually no wetting agent property, whereas copolymers (3) and (4) exhibit this property, copolymer (3) giving the best results, in particular in the presence of NaCl. Further measurements are carried out using copolymer (3) as a 0.58% by weight aqueous solution with 0.1 M NaCl and various hydrophobic substrates, namely ethylated glass, polyvinyl chloride (PVC), polypropylene (PP), an acrylic plastic and an ABS resin.

The results obtained are collated in Table 3 hereinbelow.

TABLE 3

| Type of surface | Type of contact angle | Before coating | Exposure for 24 h, then intensive rinsing | After exposure for 6 days | After exposure for 6 days, then intensive rinsing | After exposure for 6 days |
|---|---|---|---|---|---|---|
| Methylated silica | Advancing Receding | 90° 76° | Wetted | Wetted | A film of water remains | 55° Smaller than 13° |
| PVC | Advancing Receding | 90° 65° | Slowly dewets | Wetted | Rapidly dewets | 75° Smaller than 10° |
| PP | Advancing Receding | 106° 69° | Slowly dewets | Wetted | A film of water remains | 87° Smaller than 13° |
| Acrylic resin | Advancing Receding | 74° 56.4° | Slowly dewets | Wetted | Rapidly dewets | 75° Smaller than 12° |
| ABS | Advancing Receding | 94° 42° | Dry | Slightly wetted | Very rapidly dewets | 89° 17° |

It is apparent from Table 3 that the receding contact angles obtained are always less than 18°. Surprisingly and unexpectedly, suitable results are obtained with polypropylene, a substrate which is known to be very difficult to wet.

(III) Illustration of the Properties as Adhesion Primer of the Copolymers (1) to (4) Prepared Hereinabove:

Copolymers (1) to (4) are used in the state in which they are found after dialysis and neutralization to pH 9 or not. A 0.1% solution in water of the polymers of Examples (1) to (4) is coated onto various plastic surfaces with a film drawer in order to deposit a film with a thickness of 50 micrometres. These surfaces are made of polyamide (PA), polycarbonate (PC), poly- (ethylene terephthalate) (PETP), poly(methyl methacrylate) (PMMA), PS (polystyrene) and poly(vinyl chloride) (PVC).

After drying, a film of latex (Rhodia DS 1003 commercial latex) is coated with a film drawer in order to deposit a film with a thickness of 1.5 mm with a 90° angle. The latex film is subsequently peeled from the surface with a tensile testing machine. The peel strength is measured at a constant pull rate of 800 mm per minute. The strength is expressed in newtons per millimetre (total peel strength divided by the width of the peeled strip).

The results obtained are collated in Table 4 hereinbelow.

It may be observed from Table 4 that the dry adhesion of the latex film is greatly increased on all the plastic surfaces coated beforehand with the solutions of the copolymers of Examples (3) and (4) according to the invention, in comparison with the adhesion of the control latex film used without precoating or with precoating with solutions of the copolymers of Comparative Example (1) and (2). It is noteworthy that the copolymer of, for example, Example (4) gives excellent results on all the substrate types (maximum strength) and that the copolymer of Example (3) also gives very good results. The copolymers of Comparative Examples (1) and (2) give poor results.

TABLE 4

| Surfaces | Control | Copolymer Example 1 | Example 2 | Example 3 | Example 4 |
|---|---|---|---|---|---|
| PA | 1.0 | 1.8 | 2.6 | 3 | 3.7 |
| PC | 0.8 | 2.0 | 1.2 | 3.6 | 3.4 |
| PETP | 0.9 | 2.1 | 1.2 | 1.5 | 3.7 |
| PMMA | 2.0 | 3.6 | 1.6 | 3.6 | 3.7 |
| PS | 1.5 | 3.8 | 1.8 | 4.1 | 3.5 |
| PVC | 1.6 | | | | 3.1 |

What is claimed is:

1. A water-soluble block copolymer comprising at least one block of hydrophobic nature and at least one block of hydrophilic nature, the block of hydrophobic nature exhibiting hydrophilic units in an amount of between 33% and 99% by weight with respect to the total weight of the units of the hydrophobic block.

2. A block copolymer according to claim 1, wherein, in solution in water, said copolymer is in the form of a fluid and transparent aqueous solution up to a concentration of about 5% by weight.

3. A block copolymer according to claim 1, wherein the hydrophobic block exhibits hydrophilic units in an amount of between 33% and 80% by weight with respect to the total weight of the units of the hydrophobic block.

4. A block copolymer according to claim 1, wherein the block of hydrophilic nature exhibits hydrophobic units in an amount of between 1 and 20% by weight with respect to the total weight of the units of the hydrophilic block.

5. A block copolymer according to claim 1, wherein the block of hydrophilic nature is an entirely hydrophilic block.

6. A block copolymer according to claim 1, wherein at least one of said blocks is a copolymer resulting from the copolymerization of hydrophilic and hydrophobic monomers.

7. A block copolymer according to claim 6, wherein the amounts of hydrophilic and hydrophobic units in each of said blocks are controlled by the respective contents of hydrophilic monomers and of hydrophobic monomers during the polymerization of the blocks.

8. A block copolymer according to claim 6, wherein at least one of said blocks is a copolymer resulting:
from the polymerization of monomers which can be rendered hydrophilic by hydrolysis, of non-hydrolysable hydrophobic monomers and of hydrophilic monomers,
and then from the hydrolysis of the polymer obtained.

9. A block copolymer according to claim 8, wherein the amounts of hydrophilic and hydrophobic units in each of said blocks are controlled by the amount of monomers which can be rendered hydrophilic by hydrolysis and by the degree of hydrolysis.

10. A block copolymer according to claim 6, wherein the hydrophobic monomers are:
vinylaromatic monomers,
diolefins,
alkyl acrylates or alkyl methacrylates, whose alkyl group comprises from 1 to 10 carbon atoms.

11. A block copolymer according to claim 10, wherein the hydrophilic monomers are:
carboxylic acids comprising ethylenic unsaturation,
N-methylacrylamide, N-isopropylacrylamide), methacrylamide, poly(ethylene glycol) (meth)acrylate, poly(vinyl alcohol) (meth)acrylate, poly(hydroxy ($C_1$–$C_4$)alkyl (meth)acrylate) (meth)acrylate, poly(N-methylolacrylamide) (meth)acrylate, poly((meth) acrylamide) (meth)acrylate macromonomers,
sodium 2-acrylamido-2-methylpropanesulphonate (AMPS), sodium styrenesulphonate or sodium vinylsulphonate.

12. A block copolymer according to claim 6, comprising monomers which are rendered hydrophilic by hydrolysis and which are:
methyl acrylate, ethyl acrylate, hydroxyethyl acrylate, hydroxyethyl methacrylate, tert-butyl acrylate,
vinyl acetate,
quaternized 2-dimethylaminoethyl methacrylate, quaternized 2-dimethylaminoethyl,
acrylamide or (meth)acrylamide.

13. A block copolymer according to claim 1, wherein the copolymer is a diblock copolymer.

14. A block copolymer according to claim 13, wherein:
the block of hydrophilic nature comprises acrylic acid (AA) units and ethyl acrylate (EtA) units,
and the block of hydrophobic nature comprises styrene (St) and methacrylic acid (MAA) or hydroxyethyl methacrylate (HEMA) units.

15. A block copolymer according to claim 14, wherein the block of hydrophilic nature results:
from the polymerization of acrylic acid (AA) and of ethyl acrylate (EtA) in an EtA/AA ratio by weight of 98/2,
and then from the hydrolysis of the polymer obtained to a degree of at least 33 mol %.

16. A block copolymer according to claim 14, wherein the block of hydrophobic nature results from the polymerization of a mixture of monomers comprising at least 33% by weight of styrene.

17. A block copolymer according to claim 1, having a number-average molecular mass of at most 100,000 g/mol.

18. A block copolymers according to claim 1, made by a living or controlled polymerization process.

19. A process for controlling the hydrophilic-lipophilic balance of block copolymers as defined in claim 1, having at least one block coming from the polymerization of hydrophilic monomers and at least one block coming from the polymerization of hydrophobic monomers, wherein:
hydrophilic units are introduced into the block coming from the polymerization of hydrophobic monomers, or
hydrophobic units are introduced into the block coming from the polymerization of hydrophilic monomers.

20. An adhesion promoter or wetting agent comprising a block copolymer as defined in claim 1.

21. A paint comprising an adhesion promoter as defined in claim 20 according to an amount of 0.1 to 10%, by weight with respect to the total weight of the paint.

22. A paint according to claim 21, wherein said amount is of 0.5 to 5%.

23. A wetting agent in aqueous solution comprising a block copolymer as defined in claim 1 and according to an amount of 0.01 to 3%, by weight with respect to the total weight of said solution.

24. A wetting agent according to claim 23, wherein said amount is of 0.1 to 1%.

* * * * *